(12) United States Patent
Heo et al.

(10) Patent No.: US 10,812,796 B2
(45) Date of Patent: Oct. 20, 2020

(54) IMAGE DECODING METHOD AND APPARATUS IN IMAGE CODING SYSTEM

(71) Applicant: LG ELECTRONICS INC., Seoul (KR)

(72) Inventors: Jin Heo, Seoul (KR); Hyeongmoon Jang, Seoul (KR); Sunmi Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/337,802

(22) PCT Filed: Aug. 30, 2017

(86) PCT No.: PCT/KR2017/009468
§ 371 (c)(1),
(2) Date: Mar. 28, 2019

(87) PCT Pub. No.: WO2018/062699
PCT Pub. Date: Apr. 5, 2018

(65) Prior Publication Data
US 2019/0230352 A1 Jul. 25, 2019

Related U.S. Application Data

(60) Provisional application No. 62/406,409, filed on Oct. 11, 2016, provisional application No. 62/401,895, filed on Sep. 30, 2016.

(51) Int. Cl.
*H04N 19/11* (2014.01)
*H04N 19/159* (2014.01)
(Continued)

(52) U.S. Cl.
CPC .......... *H04N 19/11* (2014.11); *H04N 19/159* (2014.11); *H04N 19/176* (2014.11);
(Continued)

(58) Field of Classification Search
CPC .... H04N 19/46; H04N 19/147; H04N 19/186; H04N 19/154; H04N 19/11;
(Continued)

(56) References Cited

U.S. PATENT DOCUMENTS

2018/0295365 A1* 10/2018 Seregin ................ H04N 19/463

FOREIGN PATENT DOCUMENTS

| KR | 10-2011-0078509 A | 7/2011 |
|----|-------------------|--------|
| KR | 10-2015-0091184 A | 8/2015 |

(Continued)

*Primary Examiner* — Anner N Holder
(74) *Attorney, Agent, or Firm* — Dentons US LLP

(57) ABSTRACT

The image decoding method performed by a decoding apparatus, according to the present invention, comprises the steps of: receiving intra prediction mode information of a current chroma block; deriving intra prediction candidate modes of the current chroma block on the basis of a neighboring chroma block of the current chroma block; deriving an intra prediction mode of the current chroma block on the basis of the intra prediction mode information and the intra prediction candidate modes; and predict the current chroma block on the basis of the intra prediction mode, wherein the intra prediction candidate modes include an intra prediction mode applied to a neighboring chroma block of the current chroma block.

15 Claims, 9 Drawing Sheets

(51) Int. Cl.
  *H04N 19/176* (2014.01)
  *H04N 19/186* (2014.01)
  *H04N 19/513* (2014.01)
  *H04N 19/593* (2014.01)

(52) U.S. Cl.
  CPC ......... *H04N 19/186* (2014.11); *H04N 19/513* (2014.11); *H04N 19/593* (2014.11)

(58) Field of Classification Search
  CPC .... H04N 19/119; H04N 19/13; H04N 19/593; H04N 19/463
  USPC .......................................... 375/240.1–240.29
  See application file for complete search history.

(56) References Cited

FOREIGN PATENT DOCUMENTS

| KR | 20150135546 A | 12/2015 |
| KR | 101585565 B1 | 1/2016 |
| KR | 20160057364 A | 5/2016 |

\* cited by examiner (a)

(b)

IMAGE DECODING METHOD AND APPARATUS IN IMAGE CODING SYSTEM

This application is a National Phase application of International Application No. PCT/KR2017/009468, filed Aug. 30, 2017, and claims the benefit of U.S. Provisional Application No. 62/401,895, filed on Sep. 30, 2016, and U.S. Provisional Application No. 62/406,409, filed on Oct. 11, 2016, all of which are hereby incorporated by reference in their entirety for all purposes as if fully set forth herein.

BACKGROUND OF THE INVENTION

Field of the Invention

The present invention relates to an image coding technology and, most particularly, to an image decoding method and apparatus in an image coding system.

Related Art

Demand for high-resolution, high-quality images such as High Definition (HD) images and Ultra High Definition (UHD) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

Technical Objects

A technical object of the present invention is to provide a method and apparatus that can enhance image coding efficiency.

Another technical object of the present invention is to provide an intra prediction method and apparatus that can perform prediction by deriving an intra prediction mode for a current block of a chroma component.

Yet another technical object of the present invention is to provide a method and apparatus that can derive an intra prediction candidate mode of a current block of a chroma component.

Technical Solutions

According to an exemplary embodiment of the present invention, provided herein is an image decoding method performed by a decoding device. The method includes the steps of receiving information on an intra prediction mode of a current chroma block, deriving intra prediction candidate modes of the current chroma block based on a neighboring chroma block of the current chroma block, deriving an intra prediction mode of the current chroma block based on information on the intra prediction mode and the intra prediction candidate modes, and performing a prediction of the current chroma block based on the intra prediction mode, wherein the intra prediction candidate modes include an intra prediction mode applied to a neighboring chroma block of the current chroma block.

According to another exemplary embodiment of the present invention, provided herein is a decoding device performing image decoding. The decoding device includes an entropy decoder configured to receive information on an intra prediction mode of a current chroma block, and a predictor configured to derive intra prediction candidate modes of the current chroma block based on a neighboring chroma block of the current chroma block, to derive an intra prediction mode of the current chroma block based on information on the intra prediction mode and the intra prediction candidate modes, and to perform a prediction of the current chroma block based on the intra prediction mode, wherein the intra prediction candidate modes include an intra prediction mode applied to a neighboring chroma block of the current chroma block.

According to yet another exemplary embodiment of the present invention, provided herein is a video encoding method performed by an encoding device. The method includes the steps of deriving intra prediction candidate modes of the current chroma block based on a neighboring chroma block of the current chroma block, deriving an intra prediction mode of the current chroma block based on information on the intra prediction mode and the intra prediction candidate modes, performing a prediction of the current chroma block based on the intra prediction mode, and encoding and outputting information on the intra prediction mode of the current chroma block, wherein the intra prediction candidate modes include an intra prediction mode applied to a neighboring chroma block of the current chroma block.

According to a further exemplary embodiment of the present invention, provided herein is a video encoding device. The encoding device includes a predictor deriving intra prediction candidate modes of the current chroma block based on a neighboring chroma block of the current chroma block, deriving an intra prediction mode of the current chroma block based on information on the intra prediction mode and the intra prediction candidate modes, and performing a prediction of the current chroma block based on the intra prediction mode, and an entropy encoder encoding and outputting information on the intra prediction mode of the current chroma block, wherein the intra prediction candidate modes include an intra prediction mode applied to a neighboring chroma block of the current chroma block.

Effects of the Invention

According to the present invention, a more accurate intra prediction mode may be derived for a current block of a chroma component. Accordingly, prediction accuracy for the current block may be enhanced.

According to the present invention, intra prediction candidate modes for a current block of a chroma component may be derived based on block partition structures of a luma component and a chroma component. And, accordingly, an overall coding efficiency may be enhanced.

DESCRIPTION OF EXEMPLARY EMBODIMENTS

Figure 1:
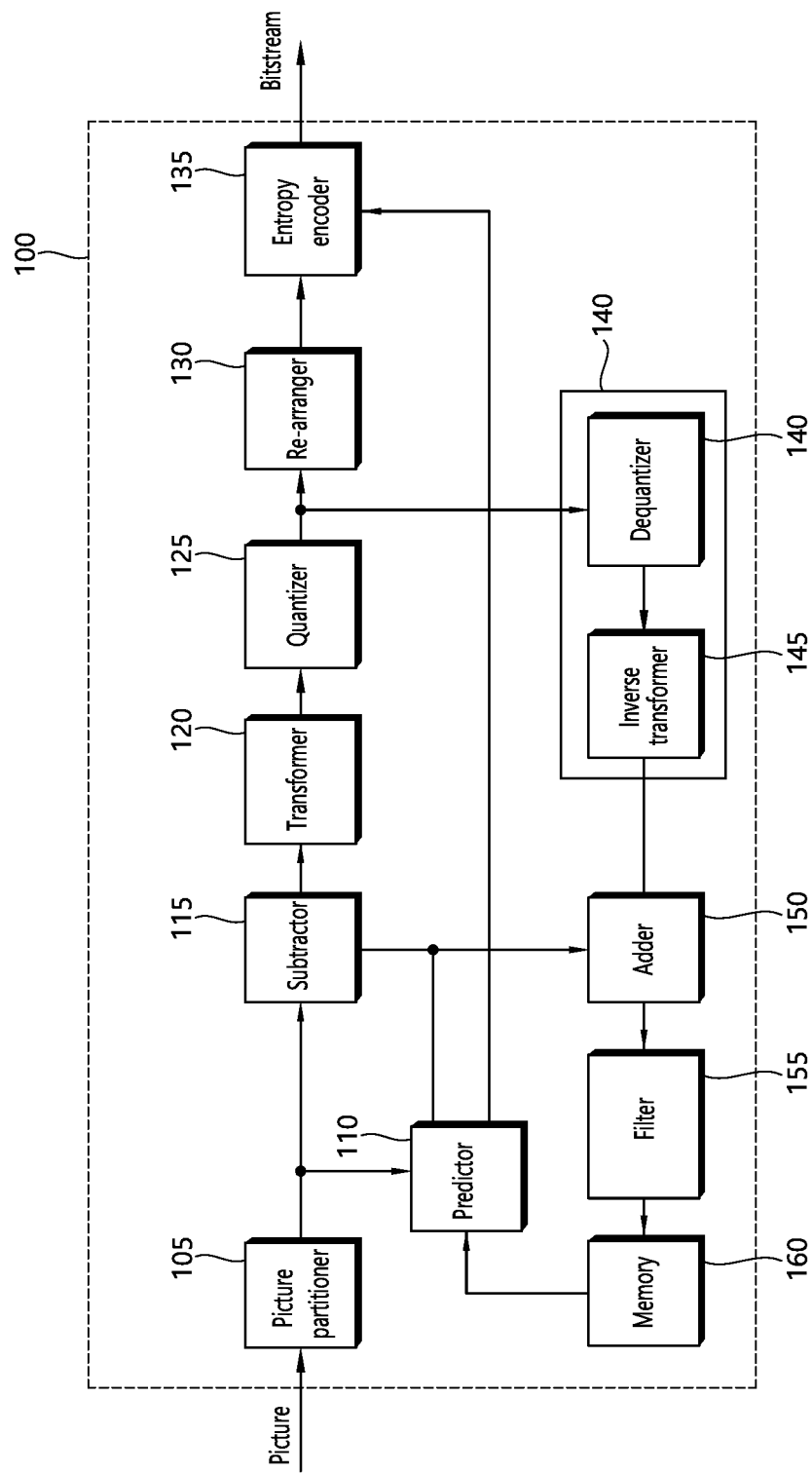
FIG. 1 is a schematic diagram illustrating a configuration of a video encoding device to which the present invention is applicable.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device (100) may include a picture partitioner (105), a predictor (110), a subtractor (115), a transformer (120), a quantizer (125), a re-arranger (130), an entropy encoder (135), a residual processor (140), an adder (150), a filter (155), and a memory (160). The residual processor (140) may include a dequantizer (141) and an inverse transformer (142).

The picture partitioner (105) may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present invention may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor (110) may perform prediction on a processing target block (hereinafter, a current block), and may generate a predicted block including prediction samples for the current block. A unit of prediction performed in the predictor (110) may be a coding block, or may be a transform block, or may be a prediction block.

The predictor (110) may determine whether intra-prediction is applied or inter-prediction is applied to the current block. For example, the predictor (110) may determine whether the intra-prediction or the inter-prediction is applied in unit of CU.

When of the intra-prediction, the predictor (110) may derive a prediction sample for the current block based on a reference sample outside the current block in a picture to which the current block belongs (hereinafter, a current picture). In this case, the predictor (110) may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor (110) may determine the prediction mode to be applied to the current block by using the prediction mode applied to the neighboring block.

When of the inter-prediction, the predictor (110) may derive the prediction sample for the current block based on a sample specified by a motion vector on a reference picture. The predictor (110) may derive the prediction sample for the current block by applying any one of a skip mode, a merge mode, and a motion vector prediction (MVP) mode. When of the skip mode and the merge mode, the predictor (110) may use motion information of the neighboring block as motion information of the current block. When of the skip mode, unlike in the merge mode, a difference (residual) between the prediction sample and an original sample is not transmitted. When of the MVP mode, a motion vector of the neighboring block is used as a motion vector predictor and thus is used as a motion vector predictor of the current block to derive a motion vector of the current block.

When of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor (115) generates a residual sample which is a difference between an original sample and a prediction sample. If the skip mode is applied, the residual sample may not be generated as described above.

The transformer (120) transforms residual samples in units of a transform block to generate a transform coefficient. The transformer (120) may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer (125) may quantize the transform coefficients to generate quantized transform coefficients.

The re-arranger (130) rearranges quantized transform coefficients. The re-arranger (130) may rearrange the quantized transform coefficients in the form of a block into a one-dimensional vector through a coefficient scanning method. Although the re-arranger (130) is described as a separate component, the re-arranger (130) may be a part of the quantizer (125).

The entropy encoder (135) may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder (135) may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer (141) dequantizes values (transform coefficients) quantized by the quantizer (125) and the inverse transformer (142) inversely transforms values dequantized by the dequantizer (141) to generate a residual sample.

The adder (150) adds a residual sample to a prediction sample to reconstruct a picture. The residual sample may be added to the prediction sample in units of a block to generate a reconstructed block. Although the adder (150) is described as a separate component, the adder (150) may be a part of the predictor (110). Meanwhile, the adder (150) may be referred to as a reconstructor or reconstructed block generator.

The filter (155) may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter (155) may apply an adaptive loop filter (ALF) to the reconstructed picture. The ALF may be applied to the reconstructed picture to which deblocking filtering and/or sample adaptive offset has been applied.

The memory (160) may store a reconstructed picture (decoded picture) or information necessary for encoding/decoding. Here, the reconstructed picture may be the reconstructed picture filtered by the filter (155). The stored reconstructed picture may be used as a reference picture for (inter) prediction of other pictures. For example, the memory (160) may store (reference) pictures used for inter-prediction. Here, pictures used for inter-prediction may be designated according to a reference picture set or a reference picture list.

Figure 2:
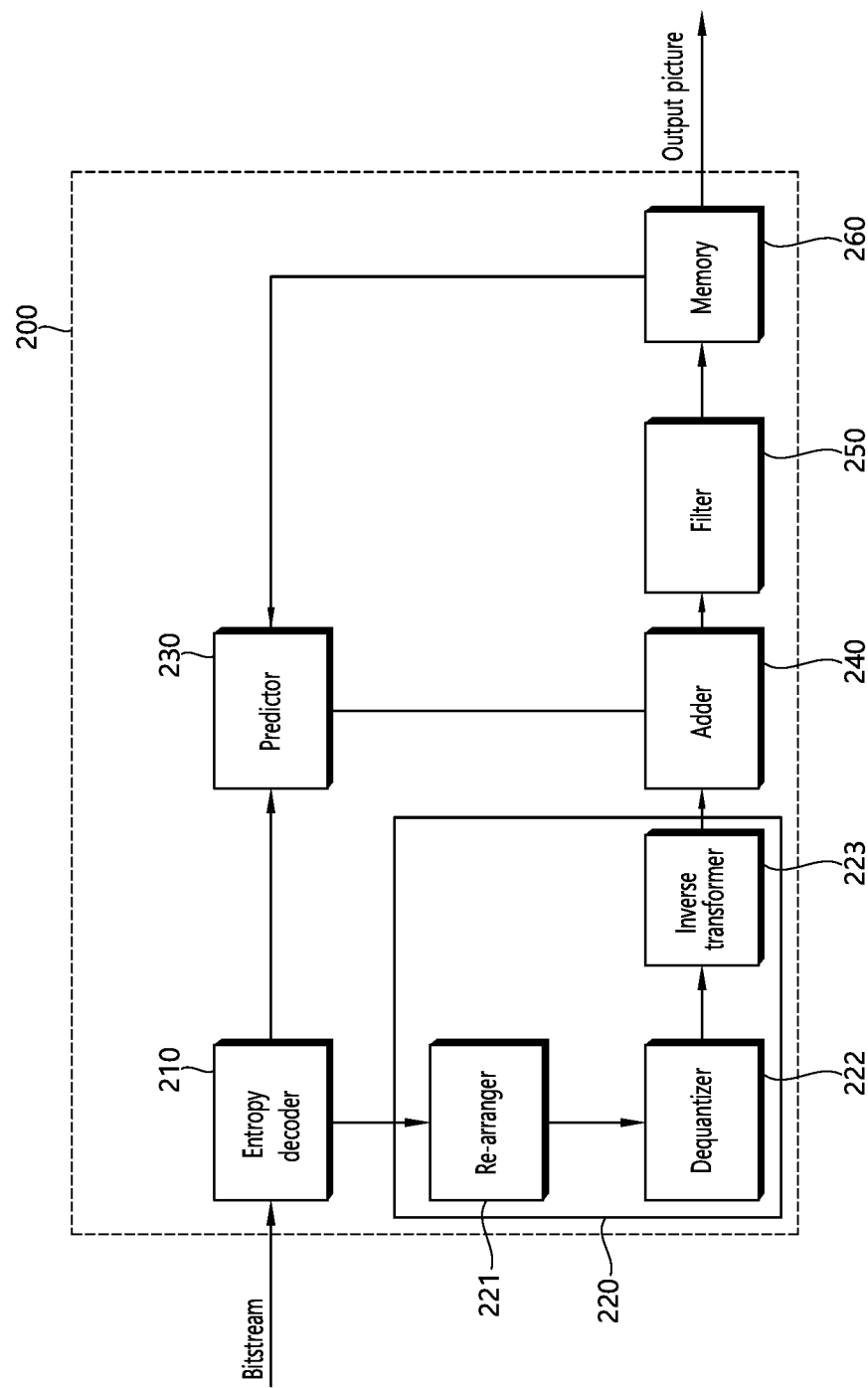
FIG. 2 is a schematic diagram illustrating a configuration of a video decoding device to which the present invention is applicable.

FIG. 2 briefly illustrates a structure of a video decoding device to which the present invention is applicable.

Referring to FIG. 2, a video decoding device (200) may include an entropy decoder (210), a residual processor (220), a predictor (230), an adder (240), a filter (250), and a memory (260). The residual processor (220) may include a re-arranger (221), a dequantizer (222), an inverse transformer (223).

When a bitstream including video information is input, the video decoding device (200) may reconstruct a video in association with a process by which video information is processed in the video encoding device.

For example, the video decoding device (200) may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder (210) may parse the bitstream to output information required for video reconstruction or picture reconstruction. For example, the entropy decoder (210) may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder (210) may be provided to the predictor (230) and residual values, that is, quantized transform coefficients, on which entropy decoding has been performed by the entropy decoder (210) may be input to the re-arranger (221).

The re-arranger (221) may rearrange the quantized transform coefficients into a two-dimensional block form. The re-arranger (221) may perform rearrangement corresponding to coefficient scanning performed by the encoding device. Although the re-arranger (221) is described as a separate component, the re-arranger (221) may be a part of the dequantizer (222).

The dequantizer (222) may de-quantize the quantized transform coefficients based on a (de)quantization parameter to output a transform coefficient. In this case, information for deriving a quantization parameter may be signaled from the encoding device.

The inverse transformer (223) may inverse-transform the transform coefficients to derive residual samples.

The predictor (230) may perform prediction on a current block, and may generate a predicted block including prediction samples for the current block. A unit of prediction performed in the predictor (230) may be a coding block or may be a transform block or may be a prediction block.

The predictor (230) may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

When of the intra-prediction, the predictor (230) may derive a prediction sample for a current block based on a neighboring reference sample in a current picture. The predictor (230) may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor (230) may derive a prediction sample for a current block based on a sample specified in a reference picture according to a motion vector. The predictor (230) may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor (230) may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor (230) may derive the motion vector of the current block using the merge index.

When Motion vector Prediction (MVP) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor (230) may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor (230) may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder (240) may add a residual sample to a prediction sample to reconstruct a current block or a current picture. The adder (240) may reconstruct the current picture by adding the residual sample to the prediction sample in units of a block. When the skip mode is applied, a residual is not transmitted and thus the prediction sample may become a reconstructed sample. Although the adder (240) is described as a separate component, the adder (240) may be a part of the predictor (230). Meanwhile, the adder (240) may be referred to as a reconstructor or reconstructed block generator.

The filter (250) may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory (260) may store a reconstructed picture (decoded picture) or information necessary for decoding. Here, the reconstructed picture may be the reconstructed picture filtered by the filter (250). For example, the memory (260) may store pictures used for inter-prediction. Here, the pictures used for inter-prediction may be designated according to a reference picture set or a reference picture list. A reconstructed picture may be used as a reference picture for other pictures. The memory (260) may output reconstructed pictures in an output order.

When the prediction is performed in the current block as described above, the prediction may be performed based on an intra prediction mode. The intra prediction mode may include 2 non-angular intra prediction modes and 33 angular intra prediction modes. The non-angular intra prediction modes may include a planar intra prediction mode and a DC intra prediction mode. The angular intra prediction modes may include intra prediction modes number 2 to number 34. The planar intra prediction mode may also be referred to as a planar mode, and the DC intra prediction mode may also be referred to as a DC mode.

Figure 3:
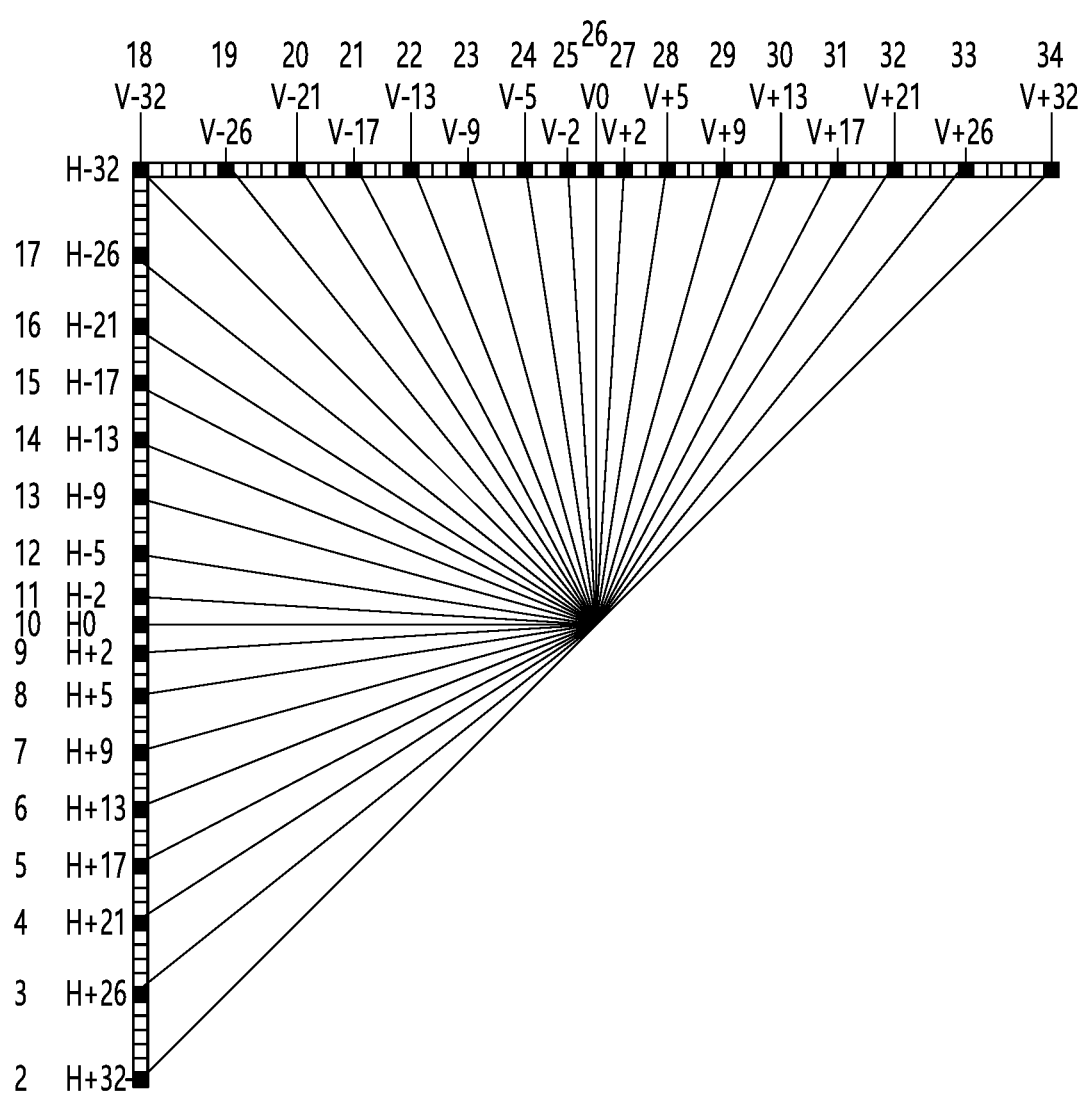
FIG. 3 illustrates examples of angular intra prediction modes of 33 prediction directions.

FIG. 3 illustrates examples of angular intra prediction modes of 33 prediction directions.

Referring to FIG. 3, the intra prediction modes may be differentiated as intra prediction modes having a horizontal directionality and intra prediction modes having a vertical directionality based on intra prediction mode number 18 having an upper left diagonal prediction direction as the center. H and V of FIG. 3 respectively indicate a horizontal directionality and a vertical directionality, and indexes within the range of −32~32 indicate $\frac{1}{32}$-unit displacements within a sample grid position. Intra prediction modes number 2 to number 17 have a horizontal directionality, and intra prediction modes number 18 to number 34 have a vertical directionality. Intra prediction mode number 10 represents a horizontal intra prediction mode or horizontal mode, and intra prediction mode number 26 represents a vertical intra prediction mode or vertical mode, and, based on these two intra prediction modes, the prediction directions of the angular intra modes may be expressed in degrees. In other words, a relative angle corresponding to each intra prediction mode may be expressed based on a horizontal reference angle 0°, which corresponds to intra prediction mode number 10, and a relative angle corresponding to each intra prediction mode may be expressed based on a vertical reference angle 0°, which corresponds to intra prediction mode number 26.

When the intra prediction is performed in the current block as described above, a prediction for a luma component of the current block and a prediction for a chroma component of the current block may be performed. Herein, the current block indicating the chroma component may be referred to as a current chroma block, and the current block indicating the luma component may be referred to as a current luma block. When the intra prediction is performed for the current chroma block, an intra prediction mode of the current chroma block may be derived based on one of the intra prediction candidate modes, which include the planar mode, the DC mode, the vertical mode, the horizontal mode, and the derived mode (DM), and, by performing the derived intra prediction modes, a prediction sample of the current chroma block may be generated. Herein, the planar mode may indicate intra prediction mode number 0, the DC mode may indicate intra prediction mode number 1, the vertical mode may indicate intra prediction mode number 26, and the horizontal mode may indicate intra prediction mode number 10. When the remaining intra prediction modes excluding the DM are selected as intra prediction candidate modes of the current chroma block, the intra prediction candidate modes may be derived as the intra prediction modes of the current chroma block, and the same process as the prediction process of a luma component of the current block, i.e., the current luma block, a prediction sample of the current chroma block may be generated.

Meanwhile, as a mode using a luma component and a chroma component that are similar to one another, and the DM may represent a method of deriving a luma intra prediction mode of a luma component corresponding to the chroma component as the intra prediction mode. Herein, the luma intra prediction mode may indicate an intra prediction mode of the luma component, and an intra prediction mode of the chroma component may be referred to as a chroma intra prediction mode, and an intra prediction candidate mode of the chroma component may be referred to as a chroma intra prediction candidate mode. More specifically, when the DM is derived as the intra prediction mode of the current chroma block, a prediction same of the current block may be derived based on the same mode as intra prediction mode of the luma block, which corresponds to the current chroma block. Additionally, when the planar mode, the DC mode, the vertical mode, or the horizontal mode is the same as the luma intra prediction mode, the prediction may be performed through the DM. And, accordingly, if one of the planar mode, the DC mode, the vertical mode, and the horizontal mode is selected as the intra prediction mode, and if the luma intra prediction mode is the same as the selected intra prediction mode, the prediction may be performed based on intra prediction mode number 34. The intra prediction mode of the current chroma block may be derived as shown below in the following table.

TABLE 1

| Prediction mode index of chroma component | Prediction mode of luma component | | | | |
|---|---|---|---|---|---|
| | Planar | Vertical | Horizontal | DC | Angular |
| 0 (Planar) | 34 | Planar | Planar | Planar | Planar |
| 1 (Vertical) | Vertical | 34 | Vertical | Vertical | Vertical |
| 2 (Horizontal) | Horizontal | Horizontal | 34 | Horizontal | Horizontal |
| 3 (DC) | DC | DC | DC | 34 | DC |
| 4 (DM) | Planar | Vertical | Horizontal | DC | Angular |

As shown in Table 1, the intra prediction candidate mode may include the above-described 5 mode types, and, for the modes, mode indexes having values ranging from 0 to 4 may be respectively used. For example, a value of a mode index indicating the planar mode may be equal to 0, a value of a mode index indicating the vertical mode may be equal to 1, a value of a mode index indicating the horizontal mode may be equal to 2, a value of a mode index indicating the DC mode may be equal to 3, and a value of a mode index indicating the DM may be equal to 4. When an intra prediction candidate mode other than the DM is selected, and when the luma intra prediction mode is the same as the selected intra prediction candidate mode, prediction may be performed in the current chroma block based on intra prediction mode number 34.

Although the above-described method for deriving an intra prediction mode for a current chroma block may be applied, depending upon a partition structure of the current chroma block, an intra prediction mode deriving method of a current chroma block, which is different from the above-described method, may enhance the coding efficiency.

Figure 4:
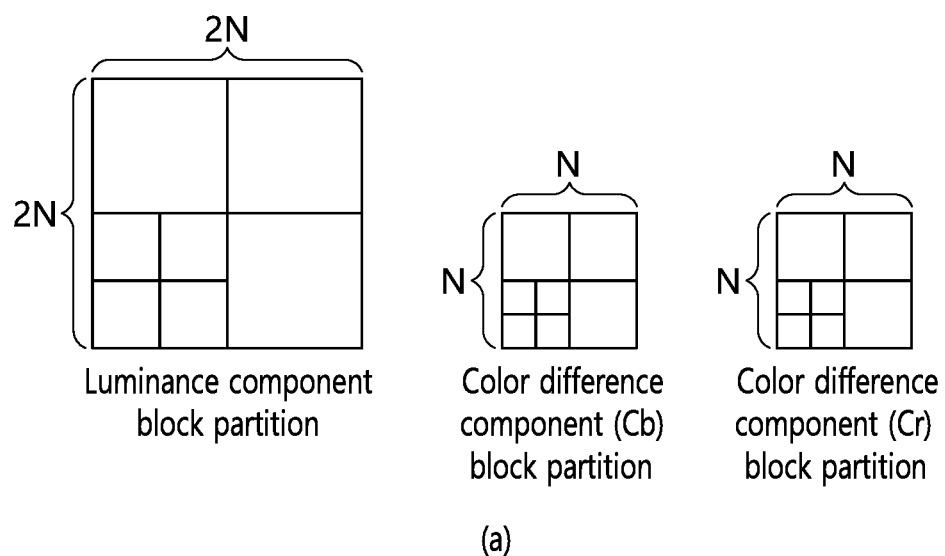
FIG. 4 illustrates examples of divided structures of a current luma block and a current chroma block.
Figure 4:
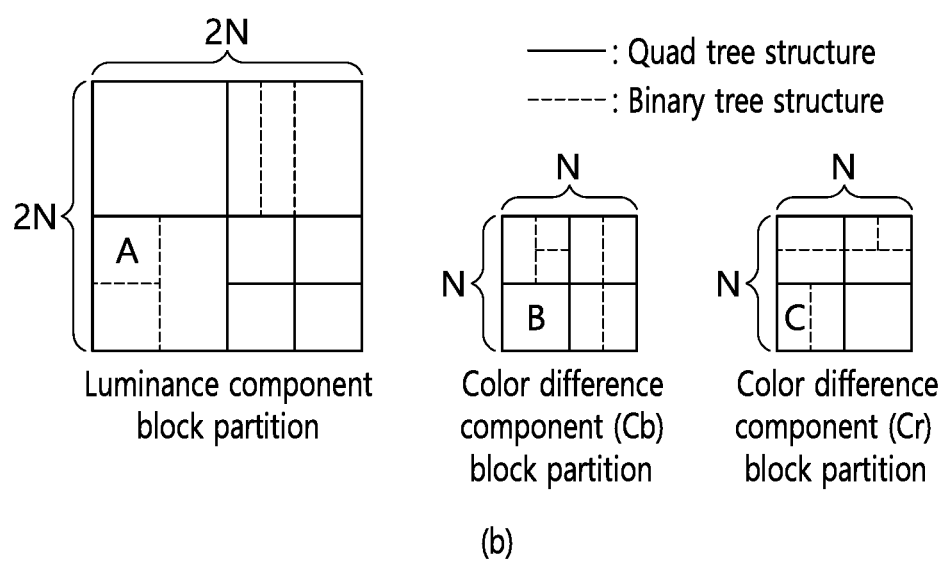

FIG. 4 illustrates examples of divided structures of a current luma block and a current chroma block. When performing video encoding, when the encoding is performed based on an intra prediction for a current block, as shown in (a) of FIG. 4, although a block size in a block partition structure for a luma component of the current block is different from a block size in a block partition structure for a chroma component of the current block, the divided form may be the same. Herein, the current chroma block may include a Cb component block and a Cr component block. As shown in (a) of FIG. 4, when the current luma block and the current chroma block have the same partition structure, it may be efficient to apply prediction mode information, which is applied to the luma component through the above-described DM, to the encoding of the chroma component.

Meanwhile, as a method for enhancing encoding efficiency by enhancing prediction accuracy, a luma component of the current block and a chroma component of the current block may have block partition structures each being different from one another, as shown in (b) of FIG. 4. In other words, a block partition structure of the current luma block and a block partition structure of the current chroma block may be different from one another. In this case, when performing the encoding process, wherein intra prediction is applied to the chroma block, it may not be efficient to use the DM, which uses the characteristic of having a luma component and a chroma component each being similar to one another.

For example, as shown in (b) of FIG. 4, the luma component and the chroma component are each divided to a different block partition structure. And, if the DM is applied in a case where a B block, which corresponds to a current chroma block for a Cb component, is encoded, an intra prediction mode of an A block, which corresponds to a luma block corresponding to the B block, may be applied to the B block. However, since the A block and the B block are each divided to a different form, the likelihood of the prediction directionality of the A block and the prediction directionality of the B block being similar to one another may be low. And, therefore, there may exist limitations (or restrictions) in performing an accurate prediction. For similar reasons, there may exist limitations in prediction accuracy when using the DM, which corresponds to an intra prediction mode that is derived from an A block, which corresponds to a luma block corresponding to a C block, for the C block, which corresponds to a current chroma block for a Cr component, and this may cause degradation in the prediction accuracy. Accordingly, the following prediction mode deriving method may be proposed.

Figure 5:
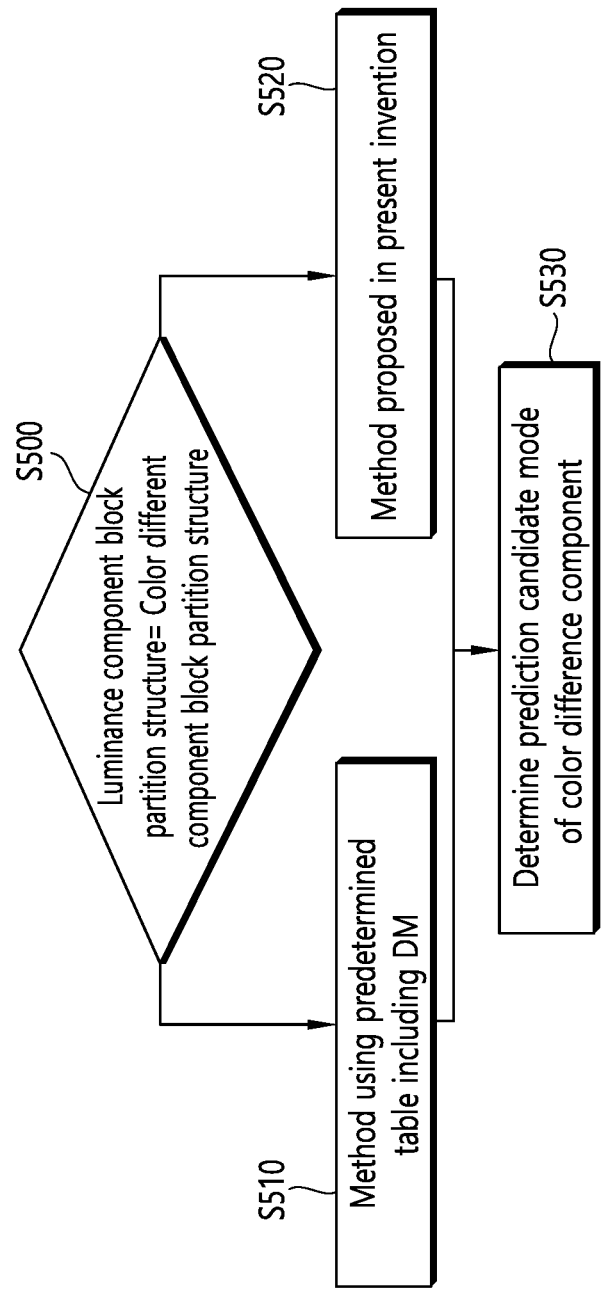
FIG. 5 illustrates an exemplary method of deriving an intra prediction candidate mode for a current chroma block.

FIG. 5 illustrates an exemplary method of deriving an intra prediction candidate mode for a current chroma block. Referring to FIG. 5, a coding device may perform a comparison between a block partition structure of a current chroma block and a block partition structure of a luma block corresponding to the current chroma block (S500). If the block partition structure of the luma block and the block partition structure of the current chroma block are the same as one another, an intra prediction candidate mode deriving method using the preconfigured table including the existing DM (e.g., the above-described Table 1) (S510).

Meanwhile, when the block partition structure of the luma block and the block partition structure of the current chroma block are different from one another, the following method may be applied (S520), and an intra prediction candidate mode may be determined by using the following method (S530). For example, when the current chroma block is a square block, the chroma blocks for each of the chroma components Cb and Cr may include the same intra prediction candidate modes. For example, the chroma component prediction candidate modes may include the above-described planar mode, DC mode, horizontal mode, vertical mode, and DM mode, which is derived from the luma block. Additionally, when the current chroma block is a non-square block, the chroma blocks for each of the chroma components may each have different intra prediction candidate modes.

Figure 6:
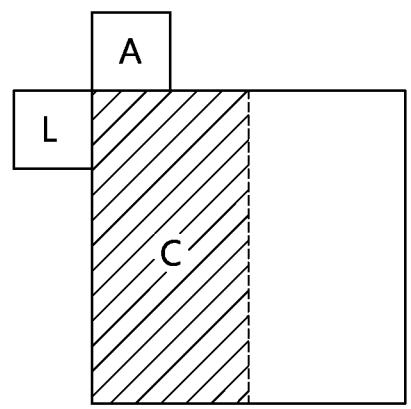
FIG. 6 illustrates an example of a divided form of a current chroma block and a neighboring chroma block of the current chroma block.

FIG. 6 illustrates an example of a divided form of a current chroma block and a neighboring chroma block of the current chroma block. Referring to FIG. 6, the current chroma block may be divided into a non-square block having a size of N×2N. A neighboring chroma block of the current chroma block may include a left-side neighboring block (L) and an upper-side neighboring chroma block. When the current chroma block is divided into a square block, an intra prediction candidate mode of the current chroma block including the DM may be generated. However, when the current chroma block is divided into a non-square block, and when the divided structure of a luma block corresponding to the current chroma block and the divided structure of the current chroma block are different from one another, in addition to the DM, the intra prediction candidate mode may be derived based on the neighboring chroma blocks that are adjacent to the current chroma block shown in FIG. 6.

More specifically, for example, the intra prediction candidate modes for the current chroma block may further include an intra prediction mode of the left-side neighboring chroma block and an intra prediction mode of the upper-side neighboring chroma block in addition to the DM. In this case, the number of intra prediction candidate modes of the current chroma block may variably change in accordance with the neighboring block of the current chroma block. For example, the intra prediction candidate modes of the current chroma block may further include the intra prediction mode of the left-side neighboring chroma block of the current chroma block and the intra prediction mode of the upper-side neighboring chroma block in addition to the 5 intra prediction candidate modes (the planar mode, the DC mode, the vertical mode, the horizontal mode, the DM mode). Considering redundancy, the intra prediction candidate modes may be variably generated within a range of 5 mode to 7 modes. More specifically, when the intra prediction mode of the left-side neighboring chroma block and the intra prediction mode of the upper-side neighboring chroma block are the same, and when the corresponding mode is not included in the above-described 5 intra prediction candidate modes, the intra prediction candidate modes of the current chroma block may be configured of 6 intra prediction candidate modes. Additionally, when the intra prediction mode of the left-side neighboring chroma block and the intra prediction mode of the upper-side neighboring chroma block are different from one another, and when the corresponding modes are not included in the above-described 5 intra prediction candidate modes, the intra prediction candidate modes of the current chroma block may be configured of 7 intra prediction candidate modes. The above-described process may be applied to the chroma blocks for each of the two chroma components, a chroma block for the Cb component and a chroma block for the Cr component, and the chroma blocks for each of the two chroma components may each have a different intra prediction candidate mode.

As described above, when the block of the chroma component is divided to a non-square block, and when the block partition structure of the a luma block and a block partition structure of the chroma blocks (e.g., Cb component block and Cr component block), a prediction candidate mode for each of the chroma component blocks may be independently determined. Meanwhile, the prediction candidate modes that are variably generated according to each case may be more efficiently coded by using the method that is described below.

When 5 intra prediction candidate modes including the DM are derived, information on an intra prediction mode of the current chroma block may be encoded through a 1-bit DM flag and 2-bit mode indexes for each of the remaining 4 intra prediction candidate modes excluding the DM. Therefore, for example, when the DM is applied to the current chroma block, only the DM flag may be signaled, and, accordingly, information on the intra prediction mode of the current chroma block may be encoded to 1 bit. Additionally, when the DM is not applied to the current block, the DM flag and the mode index may be signaled, and, accordingly, information on the intra prediction mode of the current chroma block may be encoded to a total of 3 bits.

Meanwhile, a variable number of intra prediction candidate modes may be generated based on the above-described 5 modes (the planar mode, the DC mode, the vertical mode, the horizontal mode, and the DM) and the intra prediction mode of the left-side neighboring chroma block and the intra prediction mode of the upper-side neighboring chroma block. When a variable number of intra prediction candidate modes are generated based on the intra prediction mode of the left-side neighboring chroma block and the intra prediction mode of the upper-side neighboring chroma block, information of the intra prediction mode of the current chroma block may be encoded as a binary code as shown below in the following table.

TABLE 2

| Prediction mode index of color different component | Number of prediction candidates of the color different block | | |
|---|---|---|---|
| | 5 types | 6 types | 7 types |
| 6 (DM) | 0 | 0 | 0 |
| 0 (Planar) | 100 | 10 | 100 |
| 1 (Vertical) | 101 | 1100 | 101 |
| 2 (Horizontal) | 110 | 1101 | 1100 |
| 3 (DC) | 111 | 1110 | 1101 |
| 4 (L) | — | 1111 | 1110 |
| 5 (A) | — | — | 1111 |

In the above-described exemplary embodiment of the present invention, although the description limits (or restricts) the number of neighboring chroma blocks of the current chroma block for deriving the intra prediction candidate modes to 2 blocks, the number and positions of the neighboring chroma blocks for deriving the intra prediction candidate modes may both be variably determined. Additionally, a mode index indicating the additionally included intra prediction candidate mode and a binary code for the corresponding mode index may be allocated, and, by using the allocated mode index and binary code, information on an intra prediction mode of a non-square chroma block may be more efficiently encoded.

Meanwhile, syntax information that is related to the above-described method may be encoded/decoded as described above. For example, it may be determined whether or not a block partition structure of a current chroma block and a block partition structure of a luma block corresponding to the current chroma block are the same as one another. If the block partition structure of the current chroma block and the block partition structure of the luma block are the same as one another, only the DM may be used so as to perform encoding through an intra prediction mode of the current chroma block, and the existing syntax information on the current chroma block may be used to perform encoding/decoding. And, if the block partition structure of the current chroma block and the block partition structure of the luma block are not the same as one another, an intra prediction candidate mode for the current chroma block may be derived by using the above-described method, and information on the derived intra prediction candidate mode may be encoded/decoded.

Meanwhile, in the above-described intra prediction candidate mode deriving method, although the neighboring chroma blocks are limited to the left-side neighboring chroma block and the upper-side neighboring chroma block, the intra prediction candidate modes may be derived based on diverse positions and blocks of this disclosure.

Figure 7:
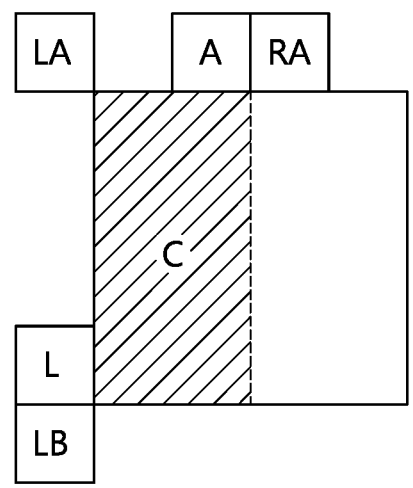
FIG. 7 illustrates an example of a divided form of the current chroma block and a divided form of a current chroma block and a neighboring chroma block of the current chroma block.

FIG. 7 illustrates an example of a divided form of the current chroma block and a divided form of a current chroma block and a neighboring chroma block of the current chroma block. As shown in FIG. 7, a C block may represent the current chroma block, and LA, A, RA, L, and LB may respectively represent an upper left-side neighboring chroma block, an upper-side neighboring chroma block, an upper right-side neighboring chroma block, a left-side neighboring chroma block, and a lower left-side neighboring chroma block of the current chroma block. As described above, the intra prediction candidate modes of the current chroma block may be derived in the order of the planar mode, the vertical mode, the horizontal mode, the DC mode, and the DM. More specifically, when the DM is not included in the planar mode, the vertical mode, the horizontal mode, and the DC mode, i.e., when the intra prediction mode of a luma block corresponding to the current chroma block is not included in the planar mode, the vertical mode, the horizontal mode, and the DC mode, the intra prediction candidate modes of the current chroma block may be derived as the planar mode, the vertical mode, the horizontal mode, the DC mode, and the DM. When the DM is included in the planar mode, the vertical mode, the horizontal mode, and the DC mode, e.g., when the DM corresponds to the vertical mode, i.e., when the intra prediction mode of the luma block corresponds to the vertical mode, the intra prediction candidate modes of the current chroma block may be derived as the planar mode, the intra prediction mode number 34, the horizontal mode, the DC mode, and the vertical mode.

When using such method, since at least 4 modes, among the planar mode, the vertical mode, the horizontal mode, the DC mode, and the DM, are included as the intra prediction candidate modes, the number of angular intra prediction modes may be increased, or the prediction efficiency may be degraded in areas where the directionality is strong. Therefore, instead of the method of deriving the above-described modes as the intra prediction candidate modes, a method of searching a prediction mode of a neighboring chroma block that is adjacent to the current chroma block and deriving the searched mode as the intra prediction mode may be proposed.

For example, the coding device may search an intra prediction mode of a neighboring chroma block of the current chroma block. In other words, the coding device may search an intra prediction mode that is applied to the neighboring chroma block of the current chroma block. For example, the coding device may search the intra prediction modes of multiple neighboring chroma block by a search order of L→A→RA→LB→LA and may derive the intra prediction mode of each neighboring chroma block. Herein, the search order may be configured as a random order. When it is possible to use the searched intra prediction mode of the neighboring chroma block as the intra prediction candidate mode, redundancy or non-redundancy with an already derived intra prediction candidate mode may be determined.

And, when the modes are not redundant, the searched mode may be derived as an intra prediction candidate mode of the current chroma block. By performing the search process, when 4 intra prediction candidate modes are derived, the coding device may end the search process. More specifically, when none of the plurality of neighboring chroma blocks is searched, a search process for the non-searched neighboring chroma blocks may not be performed. Additionally, when the search process is performed for all of the neighboring chroma blocks, 4 intra prediction candidate modes may not be derived, and, in this case, the intra prediction candidate modes of the current chroma block may be derived in the order of the planar mode, the vertical mode, the horizontal mode, and the DC mode. In this case also, redundancy or non-redundancy with an already derived intra prediction candidate mode may be determined. And, when the modes are not redundant, the searched mode may be derived as an intra prediction candidate mode of the current chroma block. When 4 intra prediction candidate modes of the current chroma block are derived, the DM may be additionally derived as the intra prediction candidate mode. More specifically, when the intra prediction candidate mode that is derived by using the DM, i.e., when the intra prediction mode of a luma block corresponding to the current chroma block corresponds to a mode that does not exist among the already derived intra prediction candidate modes, the DM may be additionally derived as the intra prediction candidate mode. However, when a prediction mode that is the same as the intra prediction that is derived by using the DM, i.e., when the intra prediction mode of a luma block corresponding to the current chroma block exists among the already derived intra prediction candidate modes, the intra prediction candidate mode that is the same as the intra prediction mode that is derived by using the DM may be replaced by a random intra prediction mode. For example, the coding device may sequentially determine redundancy or non-redundancy between frequently occurring intra prediction modes with the previously derived intra prediction candidate modes, and the first intra prediction mode that is determined as a non-redundant intra prediction mode may replace the same intra prediction candidate mode. More specifically, the coding device may determine redundancy or non-redundancy between intra prediction mode number 34, intra prediction mode number 2, intra prediction mode number 18, intra prediction mode number 27 (Vertical+1), intra prediction mode number 25 (Vertical−1), intra prediction mode number 11 (Horizontal+1), and intra prediction mode number 9 (Horizontal−1) and the previously derived intra prediction candidate modes, and the first intra prediction mode that is determined as a non-redundant intra prediction mode may replace the same intra prediction candidate mode. Afterwards, the coding device may additionally derive the DM as the intra prediction candidate mode.

Although the above-described exemplary embodiment is described by limiting the number of neighboring chroma blocks of the current chroma block for deriving the intra prediction candidate modes to 5 neighboring chroma blocks, the number and positions of the neighboring chroma blocks for deriving the intra prediction candidate modes may be variably determined. Additionally, although the number of the intra prediction candidate modes of the current blocks that are derived is limited to 5 modes, the intra prediction candidate modes may be variably determined to be equal to 6, 7, and so on.

Figure 8:
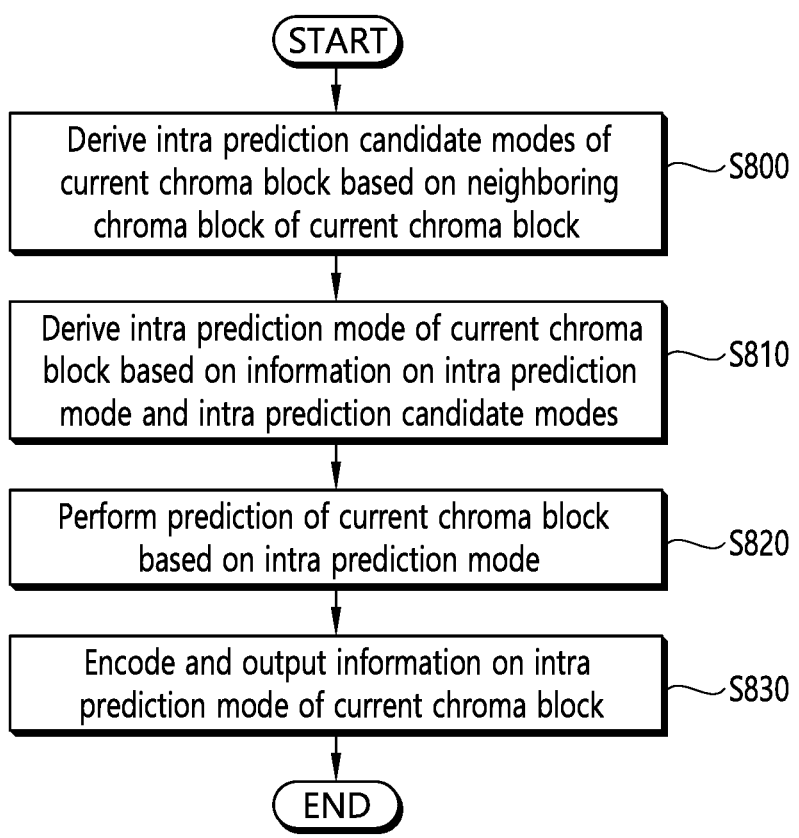
FIG. 8 is a general diagram of a video encoding method performed by an encoding device according to the present invention.

FIG. 8 is a general diagram of a video encoding method performed by an encoding device according to the present invention. The method shown in FIG. 8 may be performed by the encoding device, which is disclosed in FIG. 1. More specifically, for example, steps S800 to S820 of FIG. 8 may be performed by the predictor of the encoding device, and step S830 may be performed by the entropy encoder of the encoding device.

The encoding device derives intra prediction candidate modes of the current chroma block based on a neighboring chroma block of the current chroma block (S800). The encoding device may derive the intra prediction candidate modes of the current chroma block based on the neighboring chroma block. Additionally, the encoding device may determine whether or not the partition structure of the current chroma block and the partition structure of a luma block corresponding to the current chroma block are the same as one another. And, when the partition structures are not the same, the encoding device may derive the intra prediction mode that is applied to the neighboring chroma block as the intra prediction candidate mode.

For example, the intra prediction mode that is applied to a left-side neighboring chroma block of the current chroma block may be derived as a first intra prediction candidate mode, and the intra prediction mode that is applied to an upper-side neighboring chroma block of the current chroma block may be derived as a second intra prediction candidate mode. And, the intra prediction candidate modes of the current chroma block may include the first intra prediction candidate mode and/or the second intra prediction candidate mode. More specifically, the intra prediction candidate modes may include the planar mode, intra prediction mode number 26, intra prediction mode number 10, the DC mode, and the DM. Afterwards, when the intra prediction mode of the left-side neighboring chroma block is not the same as the previously derived intra prediction candidate modes, the intra prediction mode of the left-side neighboring chroma block may be derived as the intra prediction candidate mode. Additionally, thereafter, when the intra prediction mode of the upper-side neighboring chroma block is not the same as the previously derived intra prediction candidate modes, the intra prediction mode the upper-side neighboring chroma block may be derived as the intra prediction candidate mode. Accordingly, when the intra prediction mode of the left-side neighboring chroma block and the intra prediction mode of the upper-side neighboring chroma block are the same, and when the corresponding modes are not the same as the planar mode, the intra prediction mode number 26, the intra prediction mode 10, the DC mode, and the DM, the intra prediction candidate modes may include all of the planar mode, the intra prediction mode number 26, the intra prediction mode 10, the DC mode, the DM, the intra prediction mode of the left-side neighboring chroma block, and the intra prediction mode of the upper-side neighboring chroma block. Depending upon the sameness (or identity) or difference between the intra prediction modes, 5 to 7 intra prediction modes may be derived as the intra prediction candidate modes. Herein, the intra prediction mode number 26 may be referred to as a vertical mode, and the intra prediction mode number 10 may be referred to as a horizontal mode.

As another example, the encoding device may determine whether it is possible to derive intra prediction modes applied to the neighboring chroma blocks in the order of a left-side neighboring chroma block, an upper-side neighboring chroma block, an upper right-side neighboring chroma block, a lower left-side neighboring chroma block, and an upper left-side neighboring chroma block of the current chroma block as the intra prediction candidate modes. The encoding device may determine whether the intra prediction mode that was determined to be capable of being derived as the intra prediction candidate mode is the same as a previously derived intra prediction candidate mode, and, then, the encoding device may derive and intra prediction mode being to be different from (i.e., not the same as) the previously derived intra prediction candidate mode as the intra prediction candidate mode. By performing the above-described process, if the number of intra prediction candidate modes that are derived based on the neighboring chroma block is equal to 4 intra prediction candidate modes, intra prediction candidate modes may not be additionally derived based on the neighboring chroma block. In this case, the DM may be included in the intra prediction candidate modes. In other words, the number of intra prediction candidate modes is equal to 5. Herein, the DM may correspond to an intra prediction mode of a luma block corresponding to the current chroma block that is derived as an intra prediction mode of the current chroma block.

Additionally, for example, the encoding device may derive at least one intra prediction candidate mode according to predetermined priority levels based on neighboring chroma blocks of the current chroma block. More specifically, the neighboring chroma blocks may include at least one of a left-side neighboring chroma block, an upper-side neighboring chroma block, an upper right-side neighboring chroma block, a lower left-side neighboring chroma block, and an upper left-side neighboring chroma block of the current chroma block. Additionally, the priority levels may correspond to a decreasing order of a left-side neighboring chroma block, an upper-side neighboring chroma block, an upper right-side neighboring chroma block, a lower left-side neighboring chroma block, and an upper left-side neighboring chroma block. Meanwhile, when the intra prediction candidate modes of the current chroma block are derived based on neighboring chroma blocks of the current chroma block, the encoding device may perform a process of determining availability or non-availability of the neighboring chroma blocks in accordance with the priority levels. Thereafter, the encoding device may derive an intra prediction mode of a neighboring chroma block, which is determined to be available among the neighboring chroma blocks in accordance with the priority levels, as the intra prediction candidate mode. Additionally, when the intra prediction mode of the neighboring chroma block, which is determined to be available, is not the same as a previously derived intra prediction candidate mode, the intra prediction mode of the neighboring chroma block, which is determined to be available, may be derived as the intra prediction candidate mode. The intra prediction candidate modes may include 4 intra prediction candidate modes that are derived based on the neighboring chroma blocks and a derived mode (DM), and the DM may correspond to an intra prediction mode of a luma block corresponding to the current chroma block that is derived as an intra prediction mode of the current chroma block.

Meanwhile, the process of determining availability or non-availability of the neighboring chroma blocks may be performed based on at least one of the following conditions.

When a neighboring chroma block exists, the corresponding neighboring chroma block may be determined as being available. For example, a position of the neighboring chroma block should exist within a picture and/or within a slice, and the corresponding neighboring block should be a block that is available for reference based on its coding order. For example, a case where the corresponding neighboring chroma block is not available may include a case where a position of the neighboring chroma block is located in an outer periphery of a current picture (e.g., when the current chroma block exists near a left-side edge (or boundary) of a current picture, an upper left-side neighboring chroma block or a lower left-side neighboring chroma block of the current chroma block may be determined as being not available (or non-available)), or a case where the corresponding neighboring block is positioned in a slice or tile that is difference from the current chroma block, and so on. Herein, a slice may refer to a sequence of an integer number of CTUs. The CTUs included in the slice may be included in one independent slice segment and subsequent dependent slice segments. A tile refers to a rectangular region including CTUs (CTBs). Herein, the rectangular region may be differentiated based on a specific tile column and a specific tile row within a picture.

When an intra prediction mode is applied to a neighboring chroma block, the corresponding neighboring chroma block may be determined as being available. This is because, when the neighboring chroma block is encoded with an inter prediction mode, since an intra prediction mode of the neighboring chroma block cannot exist, an intra prediction candidate mode of the current chroma block cannot be derived from the intra prediction mode of the neighboring chroma block.

Meanwhile, among 5 intra prediction candidate modes, when the intra prediction candidate modes excluding the DM are the same as the intra prediction modes of the luma block, the encoding device may replace the intra prediction candidate modes excluding the DM with a specific intra prediction mode. For example, the encoding device may determine redundancy or non-redundancy between intra prediction mode number 34, intra prediction mode number 2, intra prediction mode number 18, intra prediction mode number 27 (Vertical+1), intra prediction mode number 25 (Vertical−1), intra prediction mode number 11 (Horizontal+1), and intra prediction mode number 9 (Horizontal−1) and the previously derived intra prediction candidate modes, and the first intra prediction mode that is determined as a non-redundant intra prediction mode may be derived as the specific intra prediction mode.

The encoding device derives an intra prediction mode of the current chroma block based on the intra prediction candidate modes (S810). The encoding device may select one intra prediction candidate mode among the intra prediction candidate modes. When the selected intra prediction candidate mode is not the same as the intra prediction mode of a luma block corresponding to the current chroma block, the encoding device may derive the selected intra prediction candidate mode as the intra prediction mode of the current chroma block. When the selected intra prediction candidate mode is the same as the intra prediction mode of a luma block corresponding to the current chroma block, the encoding device may derive a specific intra prediction mode as the intra prediction mode of the current chroma block. Additionally, the intra prediction mode of the current chroma block may be as shown in Table 1, which is presented above. Additionally, when a partition structure of the current chroma block is the same as a partition structure of a luma block corresponding to the current chroma block, the DM may be selected among the intra prediction candidate modes, and the intra prediction mode of the current chroma block may be derived as the intra prediction mode of the luma block.

Meanwhile, the specific intra prediction mode may correspond to intra prediction mode number 34. Alternatively, the encoding device may determine redundancy or non-redundancy between intra prediction mode number 34, intra prediction mode number 2, intra prediction mode number 18, intra prediction mode number 27 (Vertical+1), intra prediction mode number 25 (Vertical−1), intra prediction mode number 11 (Horizontal+1), and intra prediction mode number 9 (Horizontal−1) and the previously derived intra prediction candidate modes, and the first intra prediction mode that is determined as a non-redundant intra prediction mode may be derived as the specific intra prediction mode.

The encoding device performs prediction of the current chroma block based on an intra prediction mode (S820). The encoding device may generate a prediction sample of the current chroma block by using neighboring chroma recovery samples of the current chroma block in accordance with the intra prediction mode.

The encoding device encodes and outputs information on the intra prediction mode of the current chroma block (S830). The encoding device may generate information on the intra prediction mode of the current chroma block and may signal the information through a bitstream. The information on the intra prediction mode may indicate one of the intra prediction candidate modes. A binary code indicating the information on the intra prediction mode may be allocated with bits having variable lengths based upon the intra prediction candidate mode that is indicated by the information on the intra prediction mode. For example, when the intra prediction candidate mode being indicated by the information on the intra prediction mode corresponds to the DM, 1 bit may be allocated as the binary code, and, when the intra prediction candidate mode does not correspond to the DM, 3 bits or 4 bits may be allocated as the binary code. The binary code may be allocated as shown in Table 2, which is presented above.

Meanwhile, although it is not shown in the drawing, the encoding device may generate a residual sample based on an original sample and the derived prediction sample. The encoding device may generate information on the residual based on the residual sample. The information on the residual may include transform coefficients related to the residual sample. The encoding device may derive the recovery sample based on the prediction sample and the residual sample. More specifically, the encoding device may derive the recovery sample by adding the prediction sample and the residual sample. Additionally, the encoding device may encode the information on the residual and may output the encoded information in the form of a bitstream. The bitstream may be transmitted to a decoding device through a network or a storage medium.

Figure 9:
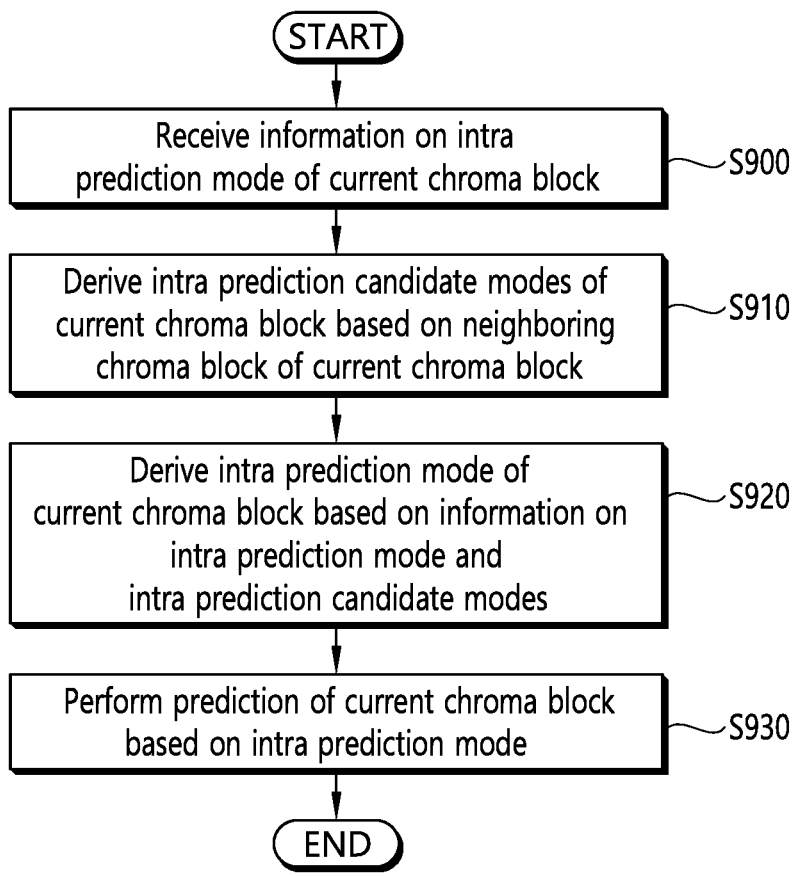
FIG. 9 is a general diagram of a video decoding method performed by a decoding method according to the present invention.

FIG. 9 is a general diagram of a video decoding method performed by a decoding method according to the present invention. The method shown in FIG. 9 may be performed by the decoding device, which is disclosed in FIG. 2. More specifically, for example, step S900 may be performed by the entropy decoder of the decoding device, and steps S910 to S930 may be performed by the predictor of the decoding device.

The decoding device receives information on an intra prediction mode of the current chroma block (S900). The decoding device may receive information on the intra prediction mode of the current chroma block through a bitstream. The information on the intra prediction mode may include a DM flag and a mode index. The DM flag may indicate whether or not the DM is applied to the current chroma block, and, when the DM is not applied, the mode index may indicate a mode that is applied to the current chroma block among the intra prediction candidate modes excluding the DM. Herein, the DM may indicate an intra prediction mode of a luma block corresponding to the current chroma block.

The decoding device derives intra prediction candidate modes of the current chroma block based on a neighboring chroma block of the current chroma block (S910). The decoding device may derive the intra prediction candidate modes of the current chroma block based on the neighboring chroma block. Additionally, the decoding device may determine whether or not the partition structure of the current chroma block is the same as the partition structure of a luma block corresponding to the current chroma block. And, when it is determined that the partition structures are not the same, the decoding device may derive the intra prediction mode that is applied to the neighboring chroma block as the intra prediction candidate mode.

For example, the intra prediction mode that is applied to a left-side neighboring chroma block of the current chroma block may be derived as a first intra prediction candidate mode, and the intra prediction mode that is applied to an upper-side neighboring chroma block of the current chroma block may be derived as a second intra prediction candidate mode. And, the intra prediction candidate modes of the current chroma block may include the first intra prediction candidate mode and/or the second intra prediction candidate mode. More specifically, the intra prediction candidate modes may include the planar mode, intra prediction mode number 26, intra prediction mode number 10, the DC mode, and the DM. Afterwards, when the intra prediction mode of the left-side neighboring chroma block is not the same as the previously derived intra prediction candidate modes, the intra prediction mode of the left-side neighboring chroma block may be derived as the intra prediction candidate mode. Additionally, thereafter, when the intra prediction mode of the upper-side neighboring chroma block is not the same as the previously derived intra prediction candidate modes, the intra prediction mode the upper-side neighboring chroma block may be derived as the intra prediction candidate mode. Accordingly, when the intra prediction mode of the left-side neighboring chroma block and the intra prediction mode of the upper-side neighboring chroma block are the same, and when the corresponding modes are not the same as the planar mode, the intra prediction mode number 26, the intra prediction mode 10, the DC mode, and the DM, the intra prediction candidate modes may include all of the planar mode, the intra prediction mode number 26, the intra prediction mode 10, the DC mode, the DM, the intra prediction mode of the left-side neighboring chroma block, and the intra prediction mode of the upper-side neighboring chroma block. Depending upon the sameness (or identity) or difference between the intra prediction modes, 5 to 7 intra prediction modes may be derived as the intra prediction candidate modes. Herein, the intra prediction mode number 26 may be referred to as a vertical mode, and the intra prediction mode number 10 may be referred to as a horizontal mode.

As another example, the decoding device may determine whether it is possible to derive intra prediction modes applied to the neighboring chroma blocks in the order of a left-side neighboring chroma block, an upper-side neighboring chroma block, an upper right-side neighboring chroma block, a lower left-side neighboring chroma block, and an upper left-side neighboring chroma block of the current chroma block as the intra prediction candidate modes. The decoding device may determine whether the intra prediction mode that was determined to be capable of being derived as the intra prediction candidate mode is the same as a previously derived intra prediction candidate mode, and, then, the decoding device may derive an intra prediction mode that is determined to be different from (i.e., not the same as) the previously derived intra prediction candidate mode as the intra prediction candidate mode. By performing the above-described process, if the number of intra prediction candidate modes that are derived based on the neighboring chroma block is equal to 4 intra prediction candidate modes, intra prediction candidate modes may not be additionally derived based on the neighboring chroma block. In this case, the DM may be included in the intra prediction candidate modes. In other words, the number of intra prediction candidate modes is equal to 5. Herein, the DM may correspond to an intra prediction mode of a luma block corresponding to the current chroma block that is derived as an intra prediction mode of the current chroma block.

Additionally, for example, the decoding device may derive at least one intra prediction candidate mode according to predetermined priority levels based on neighboring chroma blocks of the current chroma block. More specifically, the neighboring chroma blocks may include at least one of a left-side neighboring chroma block, an upper-side neighboring chroma block, an upper right-side neighboring chroma block, a lower left-side neighboring chroma block, and an upper left-side neighboring chroma block of the current chroma block. Additionally, the level of priority may correspond to a decreasing order of a left-side neighboring chroma block, an upper-side neighboring chroma block, an upper right-side neighboring chroma block, a lower left-side neighboring chroma block, and an upper left-side neighboring chroma block. Meanwhile, when the intra prediction candidate modes of the current chroma block are derived based on neighboring chroma blocks of the current chroma block, the decoding device may perform a process of determining availability or non-availability of the neighboring chroma blocks in accordance with the priority levels. Thereafter, the decoding device may derive an intra prediction mode of a neighboring chroma block, which is determined to be available among the neighboring chroma blocks in accordance with the priority levels, as the intra prediction candidate mode. Additionally, when the intra prediction mode of the neighboring chroma block, which is determined to be available, is not the same as a previously derived intra prediction candidate mode, the intra prediction mode of the neighboring chroma block, which is determined to be available, may be derived as the intra prediction candidate mode. The intra prediction candidate modes may include 4 intra prediction candidate modes that are derived based on the neighboring chroma blocks and a derived mode (DM), and the DM may correspond to an intra prediction mode of a luma block corresponding to the current chroma block that is derived as an intra prediction mode of the current chroma block.

Meanwhile, the process of determining availability or non-availability of the neighboring chroma blocks may be performed based on at least one of the following conditions.

When a neighboring chroma block exists, the corresponding neighboring chroma block may be determined as being available. For example, a position of the neighboring chroma block should exist within a picture and/or within a slice, and the corresponding neighboring block should be a block that is available for reference based on its coding order. For example, a case where the corresponding neighboring chroma block is not available may include a case where a position of the neighboring chroma block is located in an outer periphery of a current picture (e.g., when the current chroma block exists near a left-side edge (or boundary) of a current picture, an upper left-side neighboring chroma block or a lower left-side neighboring chroma block of the current chroma block may be determined as being not available (or non-available)), or a case where the corresponding neighboring block is positioned in a slice or tile that is difference from the current chroma block, and so on. Herein, a slice may refer to a sequence of an integer number of CTUs. The CTUs included in the slice may be included in one independent slice segment and subsequent dependent slice segments. A tile refers to a rectangular region including CTUs (CTBs). Herein, the rectangular region may be differentiated based on a specific tile column and a specific tile row within a picture.

When an intra prediction mode is applied to a neighboring chroma block, the corresponding neighboring chroma block may be determined as being available. This is because, when the neighboring chroma block is encoded with an inter prediction mode, since an intra prediction mode of the neighboring chroma block cannot exist, an intra prediction candidate mode of the current chroma block cannot be derived from the intra prediction mode of the neighboring chroma block.

Meanwhile, among 5 intra prediction candidate modes, when the intra prediction candidate modes excluding the DM are the same as the intra prediction modes of the luma block, the decoding device may replace the intra prediction candidate modes excluding the DM with a specific intra prediction mode. For example, the decoding device may determine redundancy or non-redundancy between intra prediction mode number 34, intra prediction mode number 2, intra prediction mode number 18, intra prediction mode number 27 (Vertical+1), intra prediction mode number 25 (Vertical−1), intra prediction mode number 11 (Horizontal+1), and intra prediction mode number 9 (Horizontal−1) and the previously derived intra prediction candidate modes, and the first intra prediction mode that is determined as a non-redundant intra prediction mode may be derived as the specific intra prediction mode.

The decoding device derives an intra prediction mode of the current chroma block based on information on the intra prediction mode and the intra prediction candidate modes (S920). The decoding device may select one intra prediction candidate mode among the intra prediction candidate modes. The information on the intra prediction mode may indicate one of the intra prediction candidate modes. When the selected intra prediction candidate mode is not the same as the intra prediction mode of a luma block corresponding to the current chroma block, the decoding device may derive the selected intra prediction candidate mode as the intra prediction mode of the current chroma block. When the selected intra prediction candidate mode is the same as the intra prediction mode of a luma block corresponding to the current chroma block, the decoding device may derive the specific intra prediction mode as the intra prediction mode of the current chroma block. The intra prediction mode of the current chroma block may be as shown in Table 1, which is presented above. Additionally, when a partition structure of the current chroma block is the same as a partition structure of a luma block corresponding to the current chroma block, the DM may be selected among the intra prediction candidate modes, and the intra prediction mode of the current chroma block may be derived as the intra prediction mode of the luma block.

Meanwhile, a binary code indicating the information on the intra prediction mode may be allocated with bits having variable lengths based upon the intra prediction candidate mode that is indicated by the information on the intra prediction mode. For example, when the intra prediction candidate mode being indicated by the information on the intra prediction mode corresponds to the DM, 1 bit may be allocated as the binary code, and, when the intra prediction candidate mode does not correspond to the DM, 3 bits or 4 bits may be allocated as the binary code. The binary code may be allocated as shown in Table 2, which is presented above.

The decoding device performs prediction of the current chroma block based on an intra prediction mode (S930). The decoding device may generate a prediction sample of the current chroma block by using neighboring chroma recovery samples of the current chroma block in accordance with the intra prediction mode.

Meanwhile, although it is not shown in the drawing, the decoding device may generate a recovery sample based on the prediction sample. The decoding device may receive information on a residual for the current block from the bitstream. The information on the residual may include transform coefficients related to a (chroma) residual sample. The decoding device may derive the residual sample (or residual sample array) for the current block based on the residual information. In this case, the decoding device may generate the recovery sample based on the prediction sample and the residual sample.

The decoding device may derive a recovery block or a recovery picture based on the recovery sample. Afterwards, as described above, the decoding device may apply an in-loop filtering procedure, such as deblocking filtering and/or a SAO procedure, to the recovery picture, as needed, in order to enhance subjective/objective picture quality.

According to the above-described present invention, a more accurate intra prediction mode may be derived for a current block of a chroma component. Accordingly, prediction accuracy for the current block may be enhanced.

Additionally, according to the present invention, intra prediction candidate modes for a current block of a chroma component may be derived based on block partition structures of a luma component and a chroma component. And, accordingly, an overall coding efficiency may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well-known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding device, comprising:
 receiving information on an intra prediction mode of a current chroma block;
 deriving intra prediction candidate modes of the current chroma block based on a neighboring chroma block of the current chroma block;
 deriving an intra prediction mode of the current chroma block based on the information on the intra prediction mode and the intra prediction candidate modes; and
 performing a prediction of the current chroma block based on the intra prediction mode,
 wherein the intra prediction candidate modes include an intra prediction mode applied to a neighboring chroma block of the current chroma block,
 wherein the step of deriving the intra prediction candidate modes of the current chroma block based on the neighboring chroma block of the current chroma block comprises comparing a partition structure of the current chroma block with a partition structure of a luma block corresponding to the current chroma block,
 wherein the intra prediction candidate modes of the current chroma block is derived further based on comparison between the partition structure of the current chroma block and the partition structure of the luma block corresponding to the current chroma block.

2. The method of claim 1, wherein the step of deriving the intra prediction candidate modes of the current chroma block based on the neighboring chroma block of the current chroma block comprises:
 when the partition structure of the current chroma block and the partition structure of the luma block corresponding to the current chroma block are not the same, deriving an intra prediction mode applied to the neighboring chroma block as an intra prediction candidate mode, and
 when the partition structure of the current chroma block and the partition structure of the luma block corresponding to the current chroma block are the same, deriving an derived mode(DM) as the intra prediction candidate mode,
 wherein the DM corresponds to a mode that derives an intra prediction mode of the luma block as an intra prediction mode of the current chroma block.

3. The method of claim 2, wherein, when the partition structure of the current chroma block and the partition structure of the luma block are the same, an intra prediction mode of the luma block is derived as the intra prediction mode of the current chroma block.

4. The method of claim 2, wherein a left-side neighboring chroma block of the current chroma block is derived as a first intra prediction candidate mode of the current chroma block,
 wherein an upper-side neighboring chroma block of the current chroma block is derived as a second intra prediction candidate mode of the current chroma block, and
 wherein the intra prediction candidate modes include the first intra prediction candidate mode and the second intra prediction candidate mode.

5. The method of claim 4, wherein the intra prediction candidate modes further includes a planar mode, intra prediction mode number 26, intra prediction mode number 10, a DC mode, and the.

6. The method of claim 5, wherein the step of deriving the intra prediction mode of the current chroma block based on the information on the intra prediction mode and the intra prediction candidate modes comprises:
 selecting an intra prediction candidate mode indicated by the information on the intra prediction mode, among the intra prediction candidate modes;
 determining whether or not the selected intra prediction candidate mode and the intra prediction mode of the luma block are the same mode; and
 when the selected intra prediction candidate mode and the intra prediction mode of the luma block are the same mode, deriving a specific intra prediction mode as an intra prediction mode of the current block.

7. The method of claim 6, wherein bits having variable lengths are allocated as a binary code indicating information on the intra prediction mode based on an intra prediction candidate mode being indicated by the information on the intra prediction mode.

8. The method of claim 1, wherein the step of deriving the intra prediction candidate modes of the current chroma block based on the neighboring chroma block of the current chroma block comprises:
 deriving at least one intra prediction candidate mode according to a priority level based on neighboring chroma blocks of the current chroma block,
 wherein the neighboring chroma blocks include at least one of a left-side neighboring chroma block, an upper-side neighboring chroma block, an upper right-side neighboring chroma block, a lower left-side neighboring chroma block, and an upper left-side neighboring chroma block of the current chroma block as the intra prediction candidate modes.

9. The method of claim 8, wherein the priority level may correspond to an order of a left-side neighboring chroma block, an upper-side neighboring chroma block, an upper right-side neighboring chroma block, a lower left-side neighboring chroma block, and an upper left-side neighboring chroma block.

10. The method of claim 8, wherein the step of deriving the intra prediction candidate modes of the current chroma block based on the neighboring chroma block of the current chroma block comprises:
 performing a process of determining availability or non-availability of the neighboring chroma blocks in accordance with the priority level,
 wherein an intra prediction mode of a neighboring chroma block that is determined to be available in accordance with the priority level, among the neighboring Aroma blocks, is derived as the intra prediction candidate mode.

11. The method of claim 10, wherein, when the intra prediction mode of the neighboring chroma block that is determined to be available is not the same as a previously derived intra prediction candidate mode, the intra prediction mode of the neighboring chroma block that is determined to be available is derived as the intra prediction candidate mode.

12. The method of claim 8, wherein the intra prediction candidate modes include 4 intra prediction candidate modes derived based on the neighboring chroma blocks and a derived mode (DM), wherein the DM corresponds to a mode that derives an intra prediction mode of a luma block corresponding to the current chroma block as an intra prediction mode of the current chroma block.

13. The method of claim 12, wherein, among the intra prediction candidate modes, when an intra prediction candidate mode excluding the DM is the same as the intra prediction mode of the luma block, the intra prediction candidate mode excluding the DM is replaced with a specific intra prediction mode.

14. A decoding device performing image decoding, comprising:
  an entropy decoder configured to receive information on an intra prediction mode of a current chroma block; and
  a predictor configured to derive intra prediction candidate modes of the current chroma block based on a neighboring chroma block of the current chroma block, to derive an intra prediction mode of the current chroma block based on information on the intra prediction mode and the intra prediction candidate modes, and to perform a prediction of the current chroma block based on the intra prediction mode,
  wherein the intra prediction candidate modes include an intra prediction mode applied to a neighboring chroma block of the current chroma block,
  wherein the predictor is further configured to compare a partition structure of the current chroma block with a partition structure of a luma block corresponding to the current chroma block,
  wherein the intra prediction candidate modes of the current chroma block is derived further based on comparison between the partition structure of the current chroma block and the partition structure of the luma block corresponding to the current chroma block.

15. The device of claim 14, wherein when the partition structure of the current chroma block and the partition structure of the luma block corresponding to the current chroma block are not the same, the predictor derives an intra prediction mode applied to the neighboring chroma block as an intra prediction candidate mode, and
  when the partition structure of the current chroma block and the partition structure of the luma block corresponding to the current chroma block are the same, the predictor derives a derived mode(DM) as the intra prediction candidate mode,
  wherein the DM corresponds to a mode that derives an intra prediction mode of the luma block as an intra prediction mode of the current chroma block.

* * * * *